(12) United States Patent
Corbefin et al.

(10) Patent No.: US 6,269,243 B1
(45) Date of Patent: Jul. 31, 2001

(54) DEVICE FOR ALLOWING THE USE IN AN AIRCRAFT OF RADIOCOMMUNICATION MEANS

(75) Inventors: René Corbefin, Mondonville; Christian Lemozit, Pibrac, both of (FR)

(73) Assignee: Aerospatiale Societe Nationale Industrielle, Paris (FR)

( * ) Notice: Subject to any disclaimer, the term of this patent is extended or adjusted under 35 U.S.C. 154(b) by 0 days.

(21) Appl. No.: 09/216,919

(22) Filed: Dec. 21, 1998

(30) Foreign Application Priority Data

Jan. 16, 1998 (FR) .................................................. 98 00427

(51) Int. Cl.$^7$ ....................................................... H04Q 7/20
(52) U.S. Cl. ........................... 455/431; 455/427; 455/574
(58) Field of Search ..................................... 455/431, 430, 455/11.1, 427, 12.1, 9, 15, 20, 66, 574

(56) References Cited

U.S. PATENT DOCUMENTS

| | | | |
|---|---|---|---|
| 5,438,610 | 8/1995 | Bhagat et al. | |
| 5,519,761 | * 5/1996 | Gilbousen | 455/11.1 |
| 5,878,345 | * 3/1999 | Ray et al. | 455/431 |
| 6,002,929 | * 12/1999 | Bishop et al. | 455/431 |
| 6,002,944 | * 12/1999 | Beyda | 455/554 |
| 6,047,165 | * 4/2000 | Wright et al. | 455/67.1 |
| 6,055,425 | * 4/2000 | Sinivaara | 455/431 |
| 6,061,562 | * 5/2000 | Martin et al. | 455/431 |

FOREIGN PATENT DOCUMENTS

| | | | |
|---|---|---|---|
| WO 94/28684 | * 12/1994 | (WO) | H04Q/7/00 |
| 9428684 | 12/1994 | (WO) . | |
| 9602094 | 1/1996 | (WO) . | |

* cited by examiner

*Primary Examiner*—William Trost
*Assistant Examiner*—Tilahun Gesesse
(74) *Attorney, Agent, or Firm*—Stevens, Davis, Miller & Mosher, LLP

(57) ABSTRACT

The present invention relates to a device for allowing the use in an aircraft (A) of a personal radiocommunication means (R), in particular a mobile telephone.

According to the invention, said device (1) comprises a first antenna (2) outside the aircraft (A), a second antenna (3) inside the aircraft (A) and a transponder (4) which comprises a first electromagnetic wave (OE) transmission and reception system coupled to the first antenna (2), a second electromagnetic wave (oe) transmission and reception system coupled to the second antenna (3), a central unit and means of authority for compelling the radiocommunication means (R) to operate at reduced power.

5 Claims, 2 Drawing Sheets

DEVICE FOR ALLOWING THE USE IN AN AIRCRAFT OF RADIOCOMMUNICATION MEANS

BACKGROUND OF THE INVENTION

1. Field of the Invention

The present invention relates to a device for allowing the use in an aircraft of at least one personal radiocommunication means.

Although the present invention is more particularly appropriate to a mobile telephone, that is to say to a self-contained telecommunication device based on communication techniques used by cellular networks, it can also be applied to other radiocommunication means, such as for example portable computer terminals. In a known manner, such portable terminals make it possible to effect a computer communication, by virtue of their connection to computer networks with the aid of built-in radio modems.

2. Description of the Related Art

It is known that mobile telephones, whose numbers have greatly increased in a short space of time, on account of reduced purchase price and affordable communication costs, are prohibited from use on board aircraft, especially civil transport aircraft, for safety reasons. This prohibition is in fact necessary in order to avoid any electromagnetic interference with electronic systems on board the aircraft, which may occur because the radiocommunication means necessarily operates at high power so that it can be picked up from outside, such interference possibly being, of course, very damaging, in particular during the takeoff and landing of the aircraft.

Additionally, when the passengers of a transport aircraft wish to communicate with their usual contacts, they have to use communication systems provided, if relevant, for this purpose on the aircraft.

Thus, as regards for example telephone communications, specific handsets with which aircraft are generally equipped are often made available to passengers to allow them to call the subscribers of the terrestrial telephone network.

The means of radiocommunication employed for this purpose use:

either geostationary satellites;

or radiocommunication installations provided on the ground and intended for air transport.

Moreover, specific installations have to be set up on the ground in order to cooperate with these radiocommunication means, and especially to transmit telephone communications to the persons called.

On the other hand, it is not possible for a subscriber located on the ground to call a passenger in the aircraft, in particular on account of complex procedures for transmitting a call to said passenger on board the aircraft.

The aforesaid solutions are therefore unsatisfactory, especially since they use complex and expensive installations intended first and foremost for air transport, thus entailing an extremely high communication cost.

Moreover, these solutions have the following drawbacks:

communication means which use ground installations have only limited geographical coverage. Moreover, since several communication systems of different types are in existence, various appropriate items of equipment are necessary on the aircraft to obtain a satisfactory communication field; and communication means which use geostationary satellites do not have worldwide coverage (the polar regions are, for example, not covered) and the limited number of available channels reduces the communication capacities.

SUMMARY OF THE INVENTION

The object of the present invention is to remedy these drawbacks. It relates to a simple and inexpensive device for allowing the use in a standard and risk-free manner, in an aircraft, of at least one personal radiocommunication means of the type alluded to above, in particular a mobile telephone.

For this purpose, according to the invention, said device is noteworthy in that it comprises:

at least one first antenna able to transmit and pick up, outside the aircraft, electromagnetic waves respectively picked up and transmitted by satellite networks or ground networks, called outside networks;

at least one second antenna able to transmit and pick up, inside the aircraft, electromagnetic waves respectively picked up and transmitted by a passenger's radiocommunication means; and a transponder which comprises :
  a first electromagnetic wave transmission and reception system coupled to said first antenna;
  a second electromagnetic wave transmission and reception system coupled to said second antenna;
  a central unit which sends, if relevant after matching, signals received by one of said first and second transmission and reception systems to the other transmission and reception system; and
  means of authority for compelling said radiocommunication means to operate at reduced power and for controlling the operation thereof.

Thus, by virtue of the invention, any passenger in the aircraft can use a personal radiocommunication means, for example a mobile telephone or a portable terminal, that is to say he can connect up to a telephone network, under the same conditions of service as if he were located on land in his office or his car, and do so without danger of interference with on-board electronic systems, since the operating power of said radiocommunication means is lowered in such a way as not to allow such interference.

Moreover, by virtue of said device in accordance with the invention, the possessor of such a radiocommunication means can not only call an opposite party, but also be called on his personal number, under the same conditions as on the ground, this being irrespective of the geographical position of the aircraft. In particular, said radiocommunication means operates in a standard manner and such operation requires no structural or functional modification thereof.

Within the framework of the present invention, the term transponder is understood to mean any device which makes it possible to establish bidirectional communications between two distinct radio-frequency networks, in this instance said outside network and a radio-frequency network created inside the aircraft by said second antenna and said second transmission and reception system.

Stated otherwise, said transponder makes it possible to create on board the aircraft an environment which is compatible with the collection of radiocommunication means (mobile telephones, etc.) present on board, and to transform this environment, outside the aircraft, into an environment which is compatible with constellations of satellites and/or ground installations forming part of said telephone network.

Moreover, advantageously, said means of authority:

act, by way of said second transmission and reception system and said second antenna, if relevant on a power auto-matching system built into said radiocommunication means; and/or are built into said central unit, thus making it possible to simplify the device in accordance with the invention.

Furthermore, said device advantageously comprises, for radiocommunication means furnished with accumulator batteries and systems for the electrical charging of batteries, at least one electrical supply means provided in proximity to a passenger seat of the aircraft, it being possible for the electrical charging system of a radiocommunication means to be plugged, with a view to the charging thereof into said electrical supply means.

Moreover, advantageously, said device also comprises a disabling means built, for example, into the central unit and able to transmit inside the aircraft, in the form of electromagnetic waves, transmission prohibition commands to a radiocommunication means, so as to prevent the use of said radiocommunication means when this proves necessary, especially for safety reasons, that is to say essentially at low altitudes in order to minimize any risk of conflict with existing terrestrial cellular telephone networks.

Of course, by virtue of the invention, this prohibition of use is much reduced and is generally limited to a few minutes during the takeoff and landing phases.

BRIEF DESCRIPTION OF THE DRAWINGS

The figures of the appended drawing will elucidate the manner in which the invention may be practiced. In these figures, identical references denote similar elements.

DETAILED DESCRIPTION OF THE PREFERRED EMBODIMENTS

Figure 1:
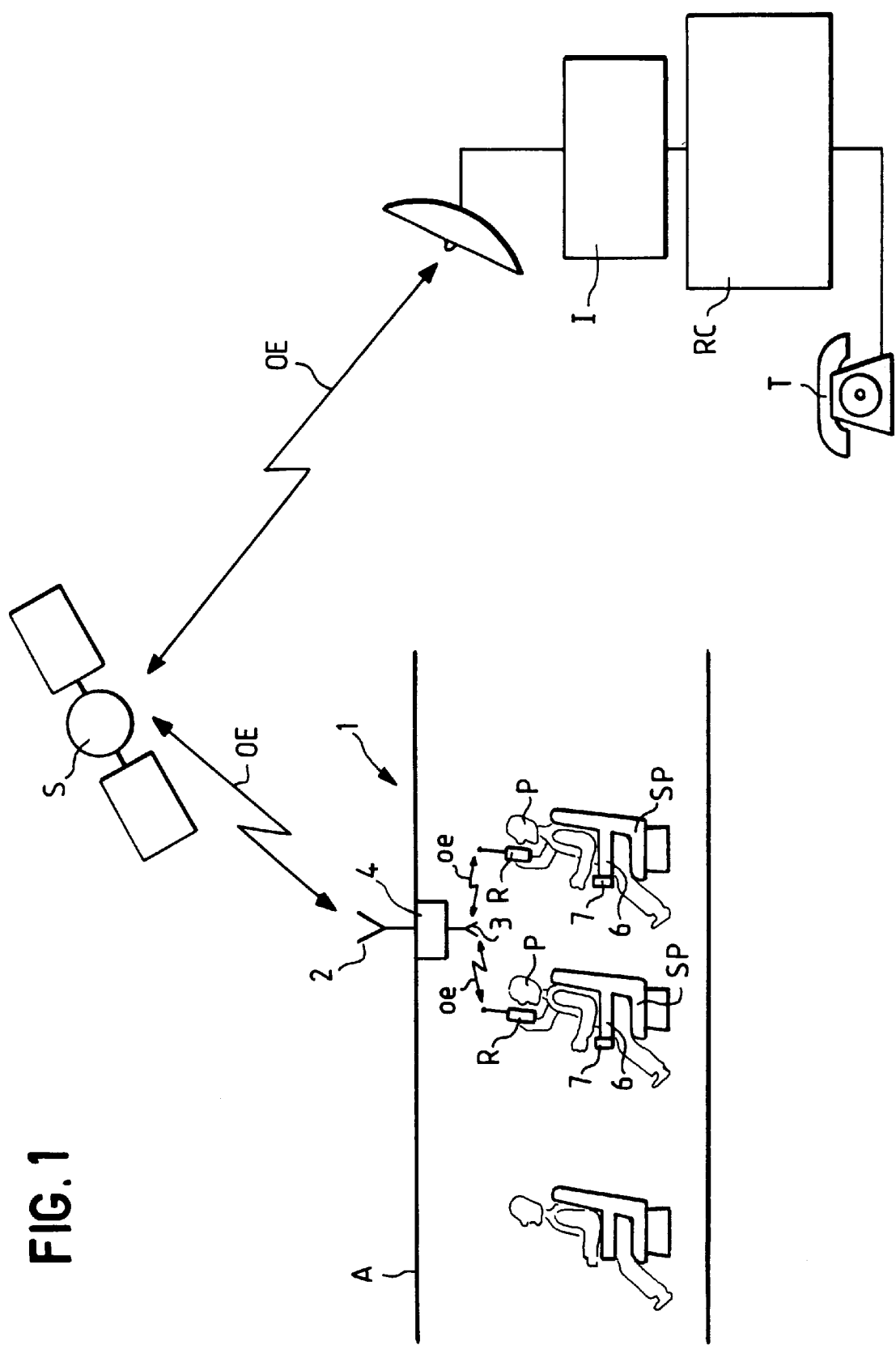
FIG. 1 diagrammatically illustrates the principle of communication by means of a device in accordance with the invention.

The device 1 in accordance with the invention is intended to allow the passengers P of an aircraft A, especially a civil transport aircraft, to use a personal radiocommunication means R, for example a mobile telephone or a portable computer terminal, to communicate with an opposite party located for example on the ground, as represented diagrammatically in FIG. 1.

For this purpose, electromagnetic waves OE transmitted with the aid of said device 1 from the aircraft A are conveyed, by way of a system of satellites S and/or of installations I provided on land, to this opposite party (not represented), who is located on an outside terrestrial telephone network (either on a cable network RC, to which a collection of telephone sets T are connected, only one such set T being represented in FIG. 1, or on a radio telephone network, not represented).

To allow the radiocommunication means R to connect up to said outside network RC and to allow normal operation without any risk of electromagnetic interference with electronic systems on board the aircraft A, said device 1 comprises according to the invention:

an antenna 2 able to transmit and pick up, outside the aircraft A, electromagnetic waves OE respectively picked up and transmitted by said system of satellites S and/or of installations I, forming part of said outside network RC;

an antenna 3 able to transmit and pick up, inside the aircraft A, electromagnetic waves oe respectively picked up and transmitted by said radiocommunication means R; and a transponder 4 which is specified below and which makes it possible to establish communications between the telephone network RC and a radio-frequency network created inside the aircraft A, to which the radiocommunication means R of the passengers P of the aircraft A can be connected. Stated otherwise, the transponder 4 is linked to the collection of these radiocommunication means R present on board the aircraft.

Figure 2:
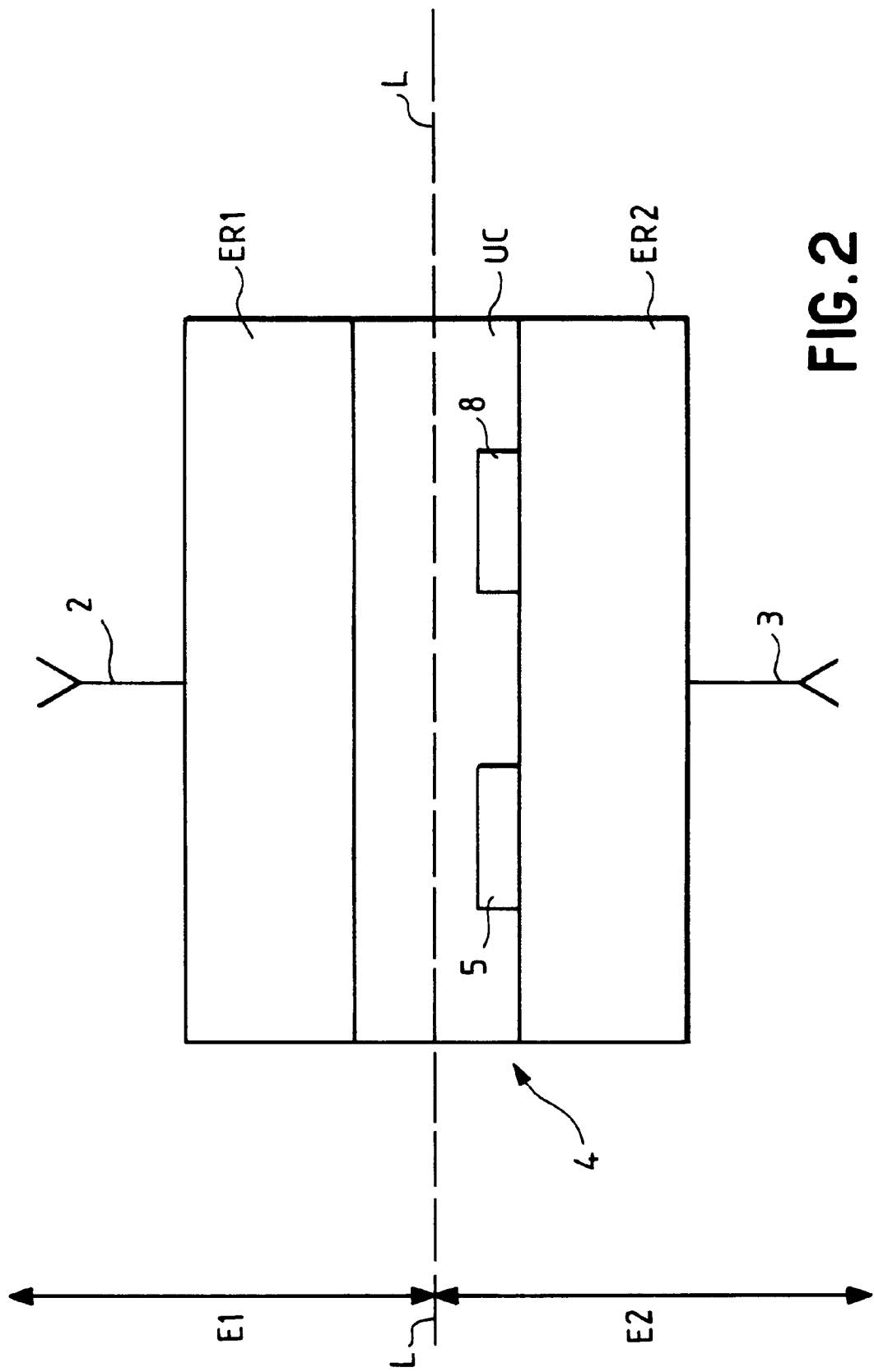
FIG. 2 is the schematic diagram of a transponder in accordance with the invention.

Represented by dashes in FIG. 2 is a line L representative of the structure of the aircraft A and illustrating the separation between a space E1 external to the aircraft A and covered by said outside network RC and a space E2 internal to the aircraft A and covered by said radio-frequency network.

According to the invention, said transponder 4 comprises, as represented in this FIG. 2:

a satellite-grade system ER1 for transmitting and receiving electromagnetic waves OE, which is coupled to said antenna 2;

a cellular-grade system ER2 for transmitting and receiving electromagnetic waves oe, which is coupled to said antenna 3;

a central unit UC which sends, if relevant after matching, signals received by one of said transmission and reception systems ER1 or ER2 to the other system ER2 or ER1; and means of authority 5 for compelling said radiocommunication means R to operate at very reduced power and for controlling the operation thereof. For this purpose, said means of authority 5 which are built into the central unit UC act, by way of the system ER2 and the antena 3, on a power auto-matching system built in the standard manner into said radiocommunication means R.

It will be noted moreover that said central unit UC comprises according to the invention, logic for processing transactions, for converting formats and for managing and controlling the device 1.

Thus, any passenger SP on the aircraft A can use a personal radiocommunication means, for example a mobile telephone R or a portable terminal, that is to say he can be connected up to a telephone network RC, under the same conditions of service as if he were located on land in his office or his car, this being without any danger of interference with electronic systems on board the aircraft A, since the operating power of said radiocommunication means R is lowered in such a way as not to allow such interference.

The possessor of such a radiocommunication means R linked to the device 1 can, consequently, call an opposite party or be called by an opposite party, who is on a terrestrial telephone network (cable network RC and/or radio telephone network), or who is furnished with a similar radiocommunication means and who is located:

in another aircraft also equipped with a device in accordance with the invention; or even in the same aircraft A.

Additionally, there is provided, in proximity to each of the passenger seats SP, for example on the armrest 6 as represented in FIG. 1 or on the back or the foldaway table, an electrical supply means 7, for example an electrical connection socket, to which may be connected if relevant an electrical charging system of the radiocommunication means R, to carry out the electrical charging of said radiocommunication means R.

Moreover, the device 1 also comprises a disabling means 8 built, for example, into the central unit UC and able to transmit, inside the aircraft A, by means of the antenna 3 or of an antenna (not represented) provided especially for this purpose, in the form of electromagnetic waves of low power, transmission prohibition commands to the radiocommunication means R present in the aircraft A. This disabling means 8 can be activated, especially as a function of flight phases of the aircraft A or of any safety procedures.

What is claimed is:

1. A device for allowing use in an aircraft of at least one personal radiocommunication means that has built in both an electrical charging system and a power auto-matching system, in particular a mobile telephone, said device comprising:

at least one first antenna for transmitting and picking up, outside the aircraft, electromagnetic waves respectively picked up and transmitted by an outside network;

at least one second antenna for transmitting and picking up, inside the aircraft, electromagnetic waves respectively picked up and transmitted by the radiocommunication means; and a transponder comprising:
   (a) a first electromagnetic wave transmission and reception system coupled to said first antenna,
   (b) a second electromagnetic wave transmission and reception system coupled to said second antenna,
   (c) a central unit which sends, if relevant after matching, signals received by one of said first and second transmission and reception systems to the other transmission and reception system, and
   (d) means of authority for compelling the radiocommunication means to operate at reduced power and for controlling the operation thereof, said means of authority acting, by way of said second transmission and reception system and said second antenna, on the power auto-matching system built into the radiocommunication means.

2. The device as claimed in claim 1, wherein said means of authority are built into said central unit.

3. The device as claimed in claim 1, wherein:

said radio communications means further comprises an electrical charging system;

said device further comprises at least one electrical supply means provided in proximity to a passenger seat of the aircraft, it being possible for the electrical charging system of the radiocommunication means to be plugged, with a view to the charging thereof, into said electrical supply means.

4. The device as claimed in claim 1, further comprising a disabling means for transmitting inside the aircraft, in the form of electromagnetic waves, transmission prohibition commands to said radiocommunication means.

5. The device as claimed in claim 4, wherein said disabling means is built into said central unit.

* * * * *